(12) United States Patent
Park et al.

(10) Patent No.: US 12,314,414 B2
(45) Date of Patent: May 27, 2025

(54) ADAPTIVE RIGHTS MANAGEMENT SYSTEM

(71) Applicant: Comcast Cable Communications, LLC, Philadelphia, PA (US)

(72) Inventors: Kyong Park, Haverford, PA (US); Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 234 days.

(21) Appl. No.: 14/950,856

(22) Filed: Nov. 24, 2015

(65) Prior Publication Data
US 2017/0147830 A1    May 25, 2017

(51) Int. Cl.
| | |
|---|---|
| *H04L 9/00* | (2022.01) |
| *G06F 16/2455* | (2019.01) |
| *G06F 16/735* | (2019.01) |
| *G06F 21/12* | (2013.01) |
| *G06F 21/62* | (2013.01) |
| *G06F 21/10* | (2013.01) |

(52) U.S. Cl.
CPC .... *G06F 21/6218* (2013.01); *G06F 16/24568* (2019.01); *G06F 16/735* (2019.01); *G06F 21/121* (2013.01); *G06F 21/107* (2023.08)

(58) Field of Classification Search
CPC ........... G06F 21/6218; G06F 16/24568; G06F 16/735; G06F 21/10; G06F 21/121; G06F 2221/0753
See application file for complete search history.

(56) References Cited

U.S. PATENT DOCUMENTS

| | | | | | |
|---|---|---|---|---|---|
| 7,124,302 | B2* | 10/2006 | Ginter | ..................... | G06F 21/10 713/189 |
| 9,118,617 | B1* | 8/2015 | Giroux | ..................... | G06F 21/62 |
| 2008/0172718 | A1* | 7/2008 | Bradley | .................. | H04L 63/08 726/1 |
| 2012/0072730 | A1* | 3/2012 | Winograd | ............. | H04L 63/102 713/176 |
| 2012/0185701 | A1* | 7/2012 | Balinsky | ............. | G06F 21/6209 713/193 |
| 2013/0205209 | A1* | 8/2013 | Levy | ....................... | H04L 65/60 715/716 |
| 2015/0033023 | A1* | 1/2015 | Xu | ..................... | H04N 21/8355 713/176 |

(Continued)

*Primary Examiner* — Syed M Ahsan
(74) *Attorney, Agent, or Firm* — Banner & Witcoff, Ltd.

(57) ABSTRACT

Methods, systems, computer-readable media, and apparatuses for providing policy-based copyright enforcement of media content items streamed to client devices are described. Various aspects discussed herein relate to managing content access rights in an adaptive bitrate environment (e.g., where an asset may be encoded and delivered at multiple different bitrates). The system discussed herein permits differentiated access to the same video, or portions of the same video, where any DRM-type client may read a manifest file including content verification data, which may be video authentication information that is specific to the video. Additional aspects discussed herein provide DRM metadata specific to each frame of a multi-bitrate video to enable the client device to verify the multi-bitrate video on a frame-by-frame basis.

25 Claims, 7 Drawing Sheets

(56) References Cited

U.S. PATENT DOCUMENTS

| | | | |
|---|---|---|---|
| 2015/0074706 A1* | 3/2015 | Hao | H04N 21/812 |
| | | | 725/24 |
| 2016/0198202 A1* | 7/2016 | Van Brandenburg | |
| | | | H04N 21/2347 |
| | | | 725/31 |
| 2016/0337704 A1* | 11/2016 | Binder | H04N 21/4332 |

* cited by examiner

ADAPTIVE RIGHTS MANAGEMENT SYSTEM

BACKGROUND

Content service providers use digital rights management (DRM) technology and/or conditional access systems (CAS) to enforce copyright restrictions of media content items, such as movies, on downstream customers. Today, copyright privileges are achieved using cryptographically-enforced privacy mechanisms. That is, the content service provider creates a metadata file to accompany an encrypted media content item provided in a stream to its customers. The customer's client device may then use decryption keys included in the metadata file to decrypt the encrypted media content item. However, because these metadata files are static (e.g., a fixed artifact), every time a content service provider wants to re-characterize and/or otherwise re-package the media content item for streaming to its customers, the content service provider must copy the media content item and link it with a new metadata file. For example, in some instances, the content service provider may wish to provide a movie as a 30-day rental, a 24-hour rental, and also provide a first-ten-minute preview of the movie. In each instance, the content service provider must copy the movie (or a portion of the movie in the case of providing the first-ten-minute segment), and link each copy with a different metadata file. As a result, in this example, the content service provider must store the movie to provide the 30-day rental, a duplicate copy of the movie to provide the 24-hour rental, and yet another copy of the first-ten-minute segment of the movie to provide the preview to the customer. The content service provider would also create a separate different metadata file for each of these copies of the movie to send to downstream customers.

The downstream client devices may enforce the copyright restrictions in accordance with an expiration date or time period of the decryption keys provided in the metadata file. Following the above example, the decryption keys would expire after 30-days for the 30-day rental and decryption keys would expire after 24-hours for the 24-hour rental. In some instances, copyright restrictions may be enforced by as a result of only providing a segment of the content item to the customer. For example, the decryption keys of the first-ten-minute segment might not expire but only the first-ten-minute segment may have been provided to the customer.

Additionally, a customer may want to record a media content item that has been or is currently being streamed to the customer's client device. In such an event, the content service provider must provide another metadata file that includes an additional encryption key to the client device. In order for the client device to record the content item, the client device must decrypt the media content item using the encryption key provided in the accompanying metadata file and then re-encrypt the title using the separately provided additional encryption key from the other metadata file.

As can be readily discerned from the above, such a copyright enforcement mechanism leads to storage of duplicate copies of media content items thereby consuming excess memory and causing increased load on the content service provider's system. Further, the content service provider must manage an excessive number of encryption keys and the client device must decrypt and re-encrypt to simply record a media content item. There is an ever-present need to more effectively manage and enforce copyright restrictions on downstream customer devices while reducing load on the system and saving storage resources.

SUMMARY

Various aspects of the disclosure provide more efficient, effective, functional, and convenient ways of dynamically changing DRM rights of a content item for reuse of the content item without having to store a duplicate copy of the content item or provide multiple metadata files. In particular, in one or more embodiments discussed in greater detail below, a policy-based enforcement mechanism and management functionalities are implemented, and/or used in a number of different ways to provide one or more of these and/or other advantages.

Various aspects discussed herein relate to managing content access rights in an adaptive bitrate environment (e.g., where an asset may be encoded and delivered at multiple different bitrates). The system discussed herein permits differentiated access to the same video, or portions of the same video, where any DRM-type client may read a manifest file including content verification data, which may be video authentication information that is specific to the video. Additional aspects discussed herein provide DRM metadata specific to each frame of a multi-bitrate video to enable the client device to verify the multi-bitrate video on a frame-by-frame basis.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
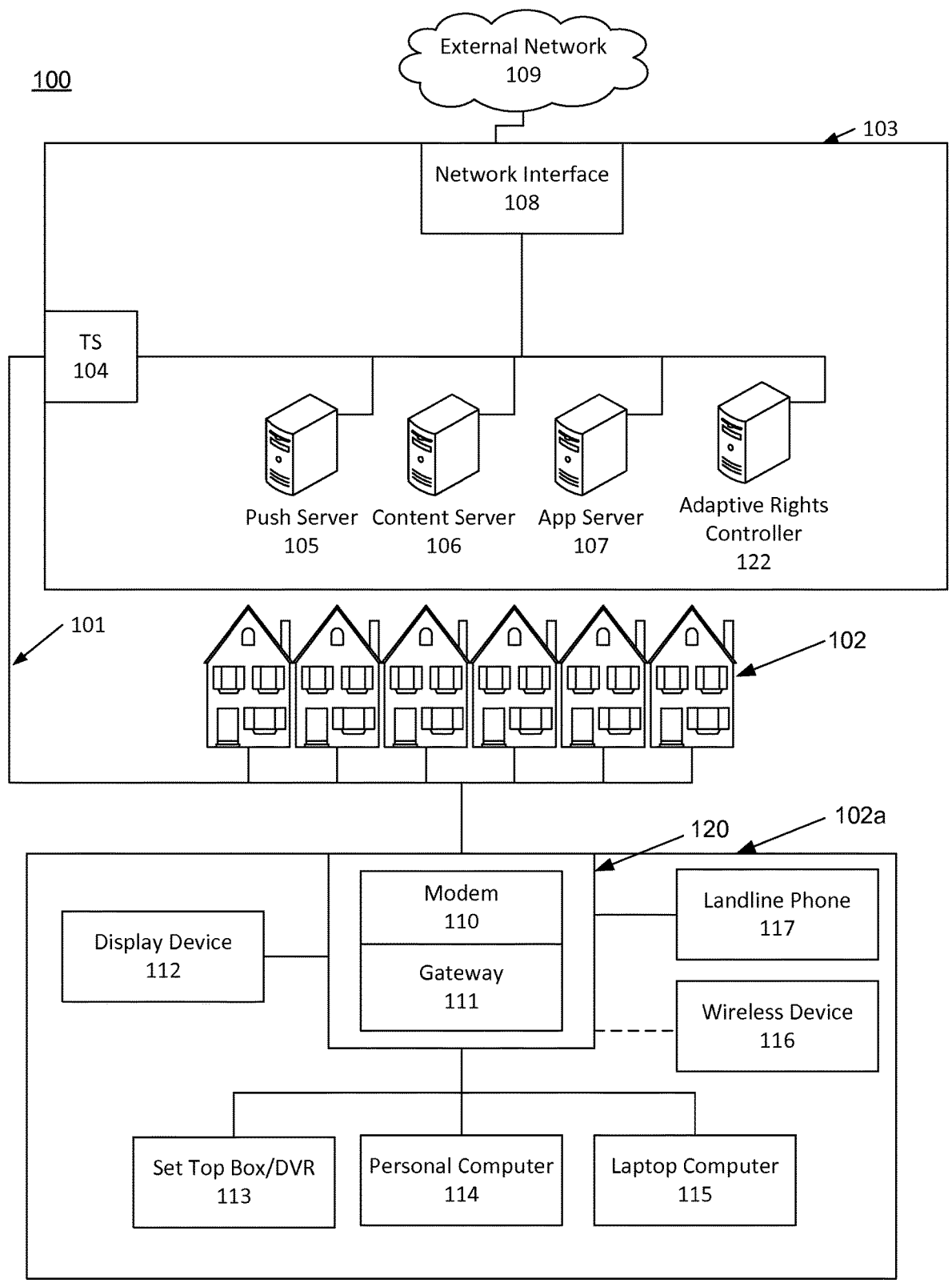
FIG. 1 depicts an illustrative communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, audio (e.g., songs), text listings (e.g., closed captioning data), etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include an adaptive rights controller 122. Although shown separately, the adaptive rights controller 122 may be combined with one or more of the push server 105, the content server 106, and the application server 107. The adaptive rights controller 122 may be a computing device responsible for on-demand generation of content identities for use with various digital rights policies to ensure copyright protection at a trusted client device. The content identities may refer to instances of a content item or asset (e.g., movie, show, program, application, game, music, etc.). The content identities may be used as an identifier to distinguish between content classes such as video-on-demand, linear unicast or multicast, and/or linear recordings that are a copy of a subset of content items on a linear stream.

As an example, a content identity of an ongoing linear stream on channel 2 may be distinguishable (e.g., different) from a content identity of a copy of the ongoing linear stream on channel 2 starting from 8:00 pm and ending at 9:00 pm, which may be the start and end time of a content item. The copy of the linear stream between 8:00 pm and 9:00 pm may be bounded and/or otherwise associated with a specific account (e.g., a user's account). As another example, a content identity of video-on-demand 24-hour rental of a movie may be distinguishable from the content identity of a 48-hour rental of the movie. As yet another example, a content identity of the 24-hour rental of the movie may be distinguishable from a content identity of a recording of the movie in a cloud-based DVR provided by the local office 103. In some embodiments, the content identity may also be specific to a user. For example, the content identity of a recording of the movie in a cloud-based DVR for a user may be distinguishable from the content identity of the recording in the cloud-based DVR for a different user. While a set of content identities may uniquely represent various versions and/or packaging of a content item as described above, each content identity in the set of content identities relates to the same content item (e.g., a master copy of a movie or show stored at the local office 103). As a result, there may be a set of content identities for each content item, which may be stored in a content identity database of the adaptive rights controller 122 or communicatively coupled to the adaptive rights controller 122.

The adaptive rights controller 122 may generate a new manifest file for each content identity of a content item. Each manifest file may include DRM metadata (e.g., content verification data) specific to the content identity of the content item. By generating a new content identity and a new manifest file, the adaptive rights controller 122 may permit differentiated access to the same content item since a downstream client device may read the manifest file specific to the content identity of the content item and utilize the content verification data to determine whether to record and/or playback a content item.

The adaptive rights controller 122 may determine a set of entitlement limits (e.g., privileges, permissions, etc.) for each content identity that are tailored to the content classes. The privileges may be in the form of encoded policy rules for use by the client device to enforce digital rights for the content item. For example, a policy for the 24-hour rental of a movie may include not permitting the client device to play the movie after the 24-hour rental period has expired. Because each content item has multiple content identities, the multiple different sets of policy rules may be associated with a content item. For example, one content identity of the content item may have a set of privileges (e.g., a 24-hour rental policy) while another content identity of the same content item may have a different set of privileges (e.g., a 48-hour rental policy). The respective encoded policies representing the entitlement limits may be included in the manifest file and considered part of the DRM metadata.

By using separate content identities to manage a set of policy rules for instance and/or packaging of a content item, the local office 103 may store a master copy of the content item rather than storing multiple separate copies of the content item for use with packaging with each instance of the content item. As an example, the local office 103 may store a single copy of the movie and have at least two content identities for the movie (e.g., one for the 24-hour rental package and one for the 48-hour rental package). Thus, when a user requests the 24-hour rental of the movie, the copy of the movie may be transmitted to the client device along with a manifest file including the policy rules associated with the content identity for the 24-hour rental period. Similarly, when a user requests the 48-hour rental movie, the copy of the movie may be transmitted to the client device along with a different manifest file including the policy rules associated with the content identity for the 48-hour rental period. The adaptive rights controller 122 might not store a separate copy of the movie for packaging as a 24-hour rental period and another separate copy of the movie for packaging as a 48-hour movie. By not storing separate copies of the movie, storage resources (e.g., memory space) of the local office 103 may be saved and/or reduced.

Additionally, the client device may be trusted to permit conditional access in accordance with the policy rules. Particularly, the client device may be trusted to determine whether the client device may access a decryption key of the content item based on whether policies and other content verification data discussed herein have been meet and/or otherwise satisfied. As an example, one or more decryption keys for the content item may be sent with an encrypted version of the content item and a manifest file specific to the content identity of the content item in a transport stream. The requesting client device may verify the content identity and determine whether encoded policies for the appropriate packaged version of the content item (e.g., a 24-hour rental period) have been met or satisfied. If the one or more encoded policies are satisfied (e.g., playback is being attempted within the 24-hour window of the rental period), the client device may then determine whether a segment of the content item is authentic (discussed in detail in FIG. 7) and, if so, decrypt of the encrypted content item using the one or more decryption keys. If one or more of the policy rules are not satisfied (e.g., playback is being attempted after the 24-hour window of the rental period has expired) or a segment of the content item is not authentic, then the client device might not decrypt the content item.

As another example, a client device may request to locally record a broadcast program. The local office 103 may transmit the encrypted broadcast program along with a manifest file (e.g., a metadata file) including one or more decryption keys and policy rules associated with the content identity for recording the content item. The requesting client device may receive and store the encrypted content item and the manifest file including DRM metadata specific to the recording (e.g., the content identity) of the content item. At a later time, the user may initiate playback of the recorded content item. If the content identify is verified, each of the encoded policies is satisfied and a segment of the content item is authentic, then the client device may decrypt the encrypted content item using the one or more decryption keys. Otherwise, if either the content identity is not verified, one of the encoded polices is not satisfied or the segment is not authentic, the client device might not decrypt the encrypted content item to block playback of the content item. Because the client device is trusted to follow DRM verifications, encoded policies and authentications, such information may be used to determine whether the recorded content item should be decrypted. By using one or more encoded policies as the gatekeeper for whether the client device may have access to the content keys, the client device might not decrypt the content item with the one or more decryption keys and then re-encrypted using one or more different encryption keys to permit local storage of the content item. Thus, processing power of the client device is saved and load on the network is reduced.

Figure 2:
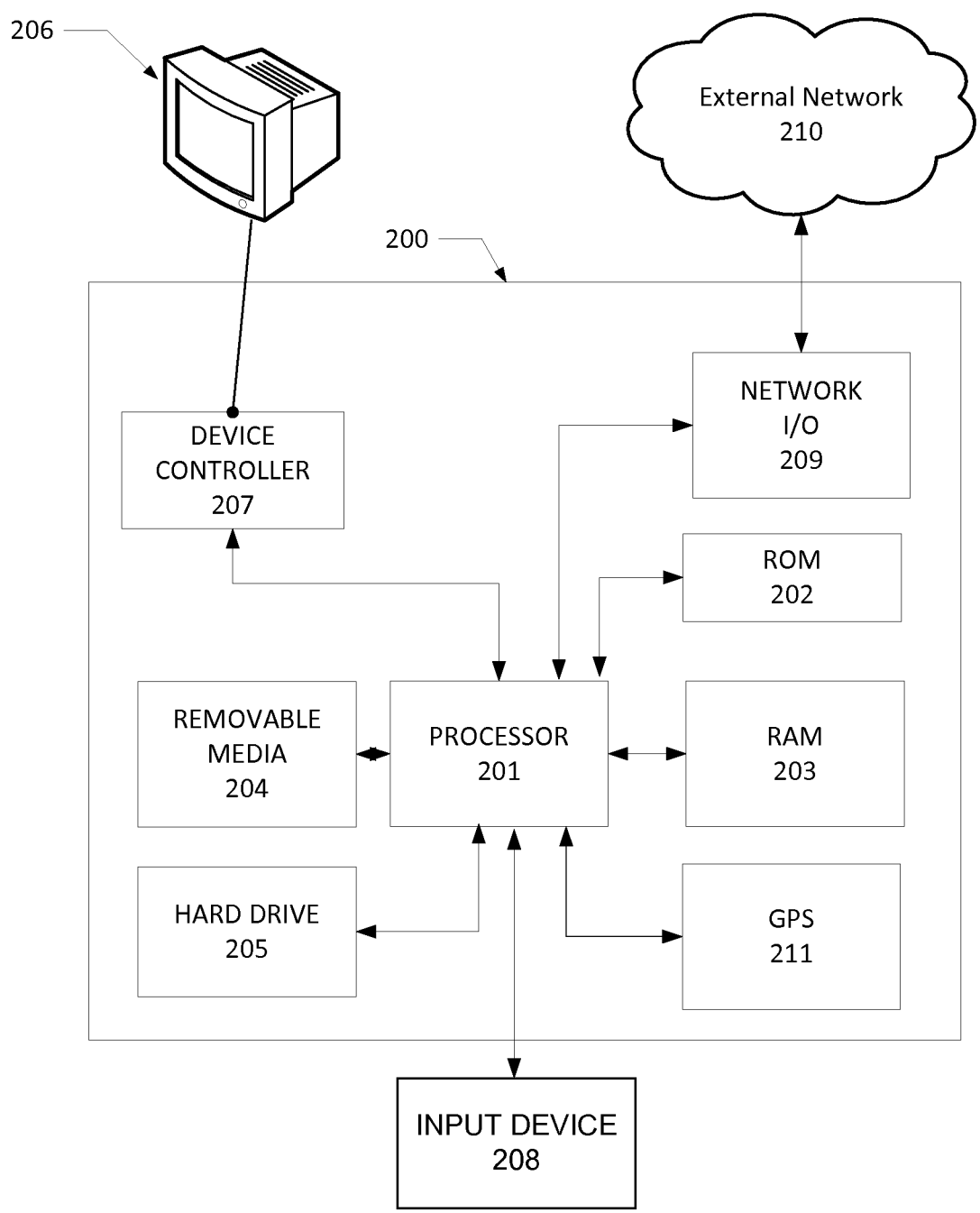
FIG. 2 depicts an illustrative computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
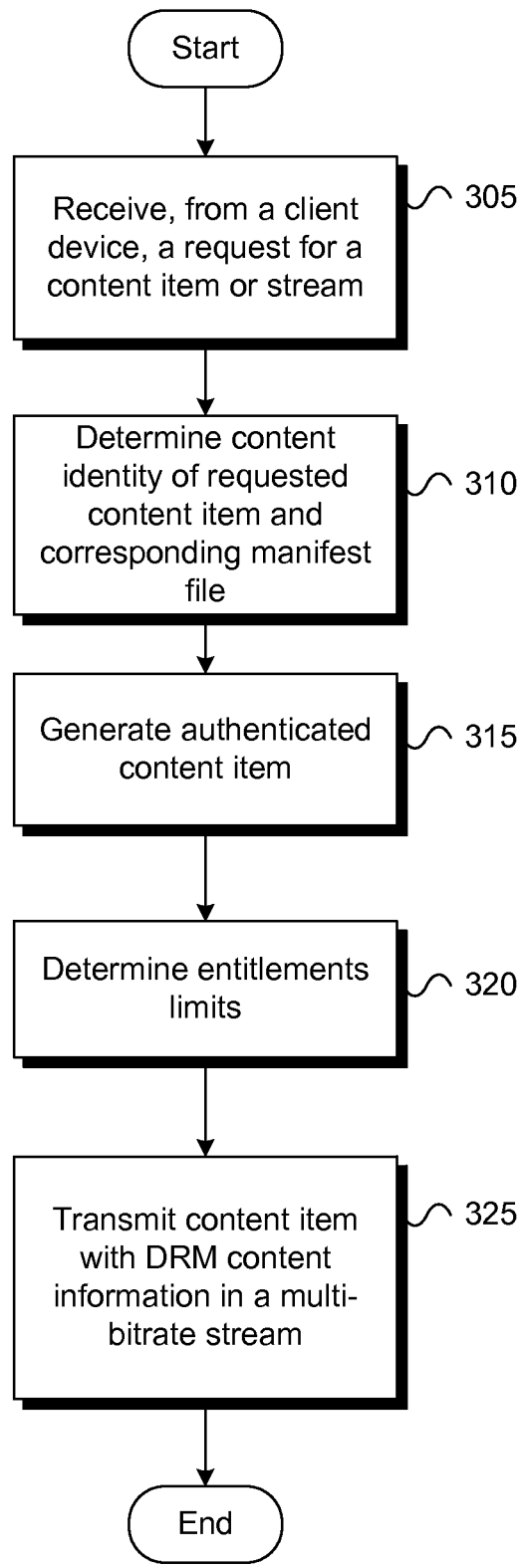
FIG. 3 depicts a flowchart of an illustrative method of managing policy-based digital rights in accordance with one or more illustrative aspects discussed herein.

FIG. 3 depicts a flowchart of an illustrative method of managing policy-based digital rights in accordance with one or more illustrative aspects discussed herein. In one or more embodiments, the method of FIG. 3 and/or one or more steps thereof may be performed by a computing device (e.g., computing device 200). In other embodiments, the method illustrated in FIG. 3 and/or one or more steps thereof may be embodied in computer-executable instructions that are stored in a computer-readable medium, such as a non-transitory computer-readable memory. In some instances, one or more of the steps of FIG. 3 may be performed in a different order. In some instances, one or more of the steps of FIG. 3 may be omitted and/or otherwise not performed.

Figure 4:
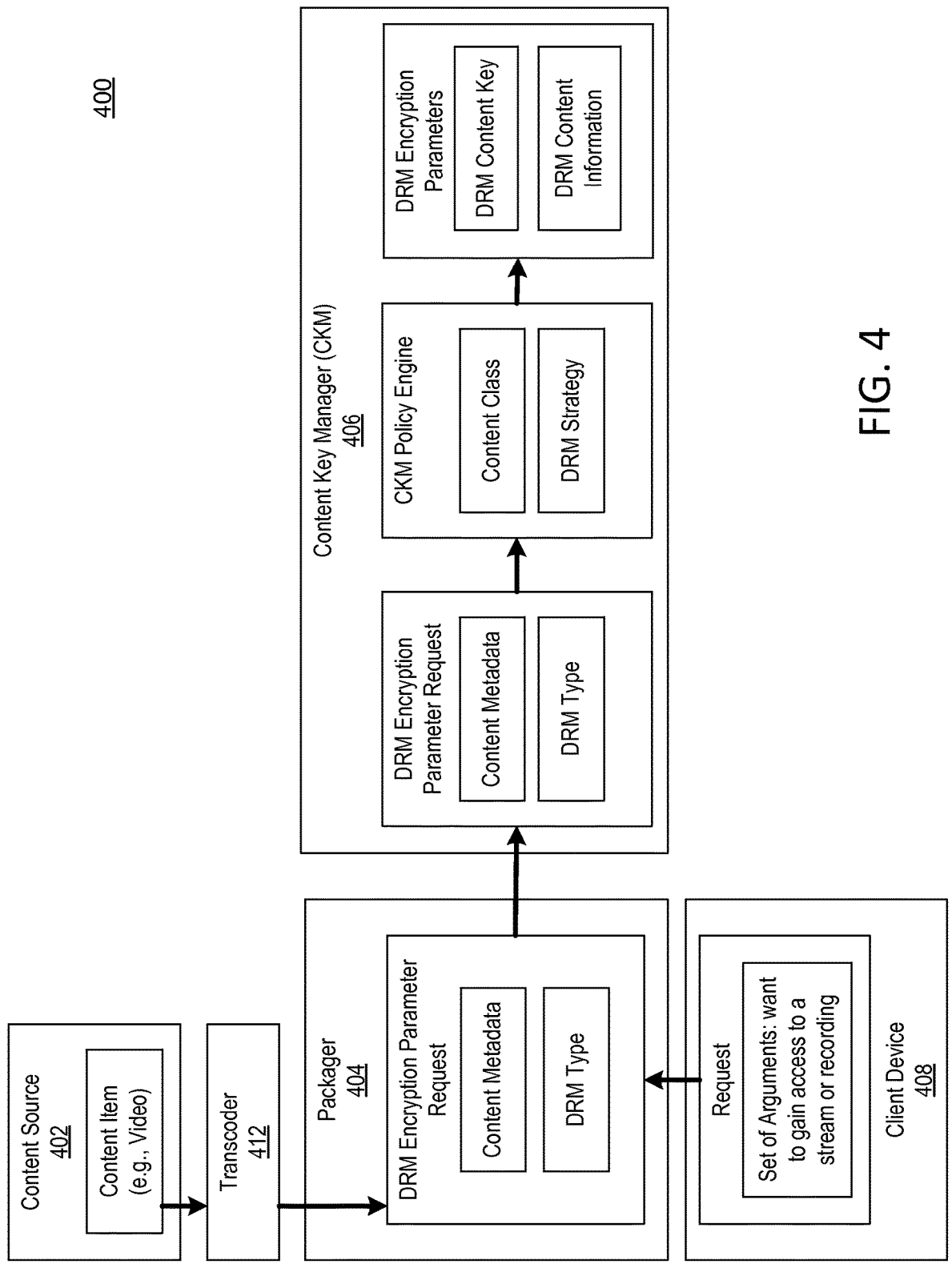
FIG. 4 depicts an illustrative message flow for a DRM video protection request in accordance with one or more illustrative aspects discussed herein.

At step 305, a computing device (e.g., the controller 122) may receive, from a client device, a request associated with a content item or a stream. A content item may include media in the form of video (e.g., television programming, movies), audio (e.g., music), games, text (e.g., closed captioning data), images, applications, and/or the like. In many cases, the request will be for one of requesting a VOD rental package of the content item or a request to record a segment of a linear stream, which may also include the start and end times of the requested recording or an identification of the content item's title or other metadata to lookup the start and end times in a schedule discussed in further detail below. FIG. 4 depicts an illustrative message flow for a DRM video protection request in accordance with one or more illustrative aspects discussed herein. As seen in FIG. 4, a system 400 may a content source 402, a transcoder 412, a packager 404, a content key manager 406 and a client device 408. The transcoder 412 may receive content items (e.g., movies, television shows, etc.) from the content source 402 and send a multi-bitrate stream including the content items to the packager 404. One or more of the packager 404 and/or the content key manager (CKM) 406 may be a part of and/or other embodied in the adaptive rights controller 122. As shown, the packager 404 may receive the request for the content item from the client device 408.

The request may include a set of arguments to obtain the content item. The set of arguments may include an indication that the client device wants to gain access to a specific stream (e.g., channel 2) or a content item (e.g., a VOD movie, a recording in a cloud-based DVR, etc.). The request may also include a variety of information about the user and the user's environment. For example, the set of arguments may include identifiers to identify the user, the user's account, the user's requesting client device (e.g., a media access control (MAC) address of the client device 408), the user's groups, and/or the like. In one example, the request is requesting to record the stream on channel 2 between 8:00 pm and 10:00 pm. In another example, the request is for a 24-hour rental package of a movie. In yet another example, the request is for a 48-hour rental package of the movie.

The packager 404 may generate a DRM encryption parameter request based on the request (e.g., the set of arguments) and the requested content item or stream. The DRM encryption parameter request may include the content item's content metadata (e.g., title, description, channel, broadcast time, etc.) and DRM type. The packager 404 may determine which content item the client device 408 is requesting using the request's arguments and a database of content item information. As an example, the packager 404 may determine that the request is for recording of a content stream on channel 2 between 8:00 pm and 10:00 pm. The packager 404 may consult a schedule in the content item information database. The schedule may identify, for each stream and/or channel, scheduled start and end times of when each content item will be transmitted on the stream to downstream client devices. In the above example, the packager 404 may determine that movie A is scheduled to be transmitted on the stream associated with channel 2 between 8:00 pm and 10:00 pm. The packager 404 may then retrieve the content metadata for movie A from the content item information database. The content metadata may include the start and end time of the movie, its title, a unique content item identifier, a parental rating for use with parental control locks of client devices, a quality level (e.g., high-definition, standard definition, etc.), and/or the like. As another example, the request may include the unique identifier or a title of the requested content item. In such an example, the packager 404 may then determine the content metadata for the content item (listed above) from the content item information database using the content item's unique identifier or title.

The packager 404 may send the DRM encryption parameter request to the CKM 406, which may be used by a CKM policy engine of the CKM 406 to determine a content class of the content item e.g., based on the content item's content metadata. As discussed above, content classes may include video-on-demand, linear unicast or multicast, and/or linear recordings that are a copy of a subset of content items on a linear stream. As an example, the CKM policy engine may identify that the start and end times associated with the requested channel (e.g., channel 2 from 8:00 pm to 10:00 pm) and, using this information, determine that the requested content item's content class is a linear record that is a copy of a subset of content items on a linear stream. As another example, the content metadata may include an indication to rent the content item and the CKM 406 may use this information to determine the content item's content class is a VOD program.

In step 310, a computing device (e.g., the adaptive rights controller 122, packager 404, CKM 406, etc.) may determine a content identity of the content item and a corresponding manifest file for the content identity. A content identity may uniquely identify an instance, package, or version of the content item in a DRM strategy. One or more content identities may be generated prior to receiving the request from the client device 408 in step 305. As an example, one content identity may represent a 24-hour VOD rental package of a movie and may be associated with a manifest file. Another content identity may represent a 48-hour VOD rental package of the same movie and may be associated with a different manifest file. These rental packages and manifest files may be generated prior to receiving a request for one of the rental packages since a variety of user's may request the package. The CKM policy engine may identify a previously-generated content identity and associated manifest file that matches the request version or package of the content item (e.g., a request for a 24-hour VOD rental package). The manifest file for a previously-generated content identity may include the same information as a newly-generated manifest file described below. In instances where the content identity and associated manifest file that match the request are previously-generated, the CKM policy engine may skip steps 315 and 320 and proceed directly to step 325.

Additionally, one or more content identities and associated manifest files may be generated on-demand and/or otherwise in response to user-driven content generation events (e.g., a request to record a subset of an ongoing stream as discussed above). As an example, the CKM 406 may generate and publish the new content identity via an identifier to distinguish the recording of the content item according to factors such as start time relative to the source and end time relative to the source. For instance, the CKM 406 may generate a new content identity for the requested recording of the subset of the ongoing stream associated with channel 2 between 8:00 and 10:00 pm and the content identity may be used uniquely identify the recording of the subset of the stream. The content identity may also be used to identify the content item associated with the recording determined above e.g., by the packager 404. In some embodiment, the CKM 406 may further characterize the content identity for the recording of the content item by the user's account which triggered the generation of the content item recording.

Additionally, one or more content identities may be generated in response to local office-driven packaging events. For example, while there may already be a 48-hour rental package of the video, the local office 103 may wish to create a free ten-minute preview of the video and/or a 24-hour rental package of the video. The CKM 406 may generate and publish a content identity for the free ten-minute preview of the video and a different content identity for the 24-hour rental package of the video. A content identity of the 48-hour rental package of the video may be different and distinguishable from the content identity for the free ten-minute preview of the video and the content identity for the 24-hour rental package of the video.

The CKM 406 may generate a new manifest file for each new content identity to store the content identity's information such as the content identity's identifier, start time, end time, user account, etc. The manifest file may in the form of an HTTP dynamic streaming (HDS) manifest file format, a smooth streaming client manifest file format, an MPEG Dash file format, or an M3U8 playlist file format. The manifest file may also store DRM metadata discussed herein (e.g., verification information, encoded policies, authentication information, etc.) specific to its associated content identity for the content item.

The new manifest file may include DRM metadata for downstream client devices to verify the content identity. For example, the manifest file may include the linear origin (e.g., the ongoing stream associated with channel 2), start time (e.g., 8:00 pm), and end time (e.g., 10:00 pm). The manifest file may also include a digital signature for each of the DRM metadata items. For example, the new manifest file may include a digital signature for the client device 408 to verify the linear origin, another digital signature for the client device 408 to verify start time, another digital signature for the client device 408 to verify the end time, etc.

In step 315, a computing device (e.g., the adaptive rights controller 122, packager 404, CKM 406, etc.) may generate an authenticated content item (e.g., an authenticated video) to permit other computing devices (e.g., downstream client devices) to determine whether a content item is associated with a content identity. For example, an authenticated content item may be a specific composition of elements (e.g., video elements) that are members of content permitting systems to recognize when elements are, or are not, associated with a content identity. For example, the manifest file associated with the content identity may include an authentication mechanism to enable the client device 408 to determine whether each segment of the content item is authentic discussed in further detail below.

The content permitting system (e.g., CKM 406) may provide verifiable artifacts in the stream to demonstrate that the content item's elements are members of a content identity. For example, the CKM 406 may determine where markers should be inserted into each bitrate stream transporting the content item to indicate different segments of the content item for authentication by the client device 408. The CKM 406 may instruct the packager 404 to insert the markers at the determined locations when packaging and transmitting a multi-bitrate stream to the client device 408. The manifest file may include marker information to enable the client device 408 to identity the markers in the multi-bitrate stream. Alternatively, rather than instructing the packager 404 to insert markers in the bitrate streams, the CKM 406 may simply determine the size and temporal location of each segment within the bitstream (e.g., start time and end time) and provided such information to the client device 408 in the manifest file so that the client device 408 may determine the segments without the aid of the inserted markers.

Figure 5:
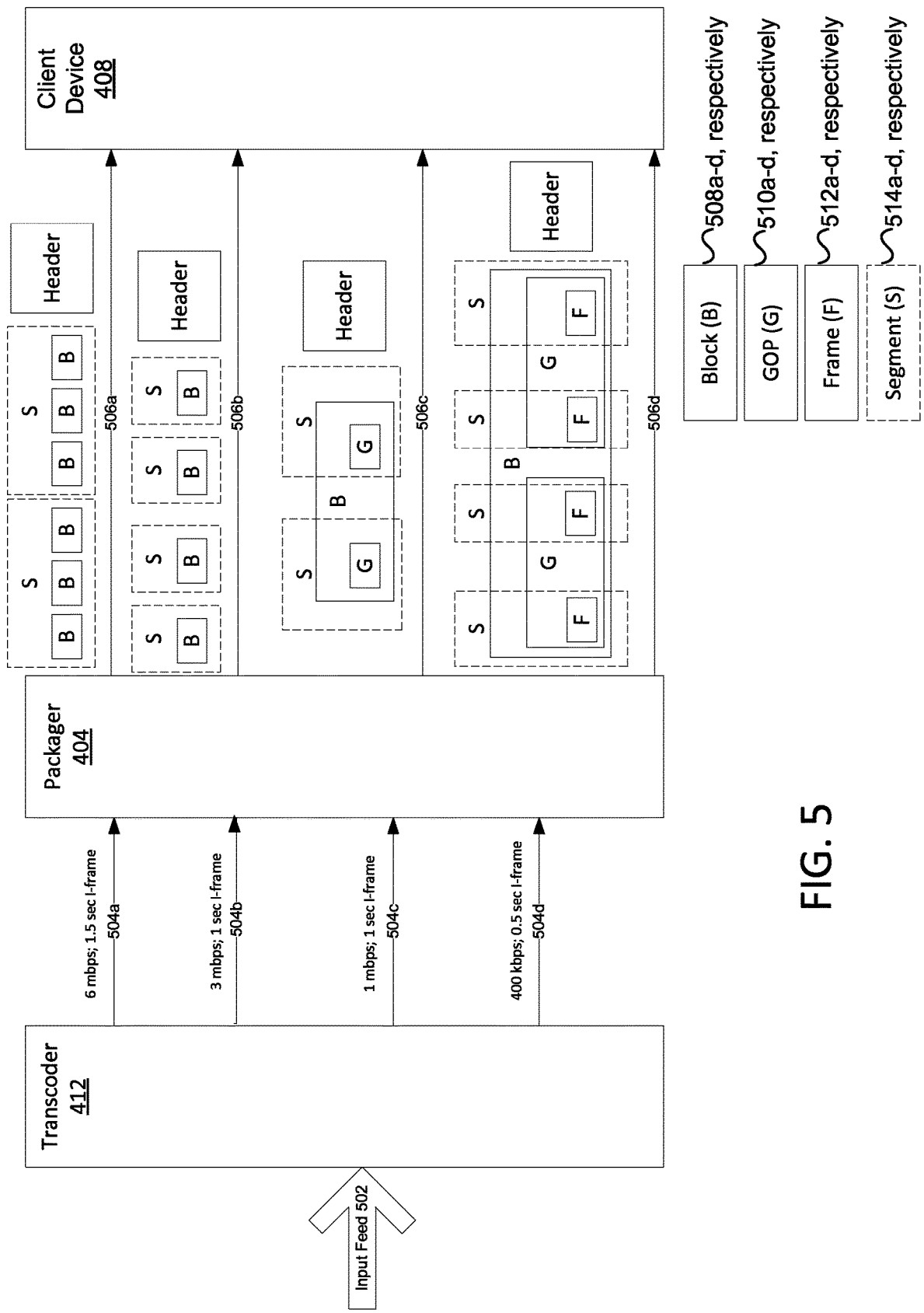
FIG. 5 depicts an illustrative system for packaging of a multi-bitrate stream in accordance with one or more illustrative aspects discussed herein.

FIG. 5 depicts an illustrative system for packaging of a multi-bitrate stream in accordance with one or more illustrative aspects discussed herein. The transcoder 412 and packager 402 may be part of any computing device of the local office 103 and embodied in a single device or on two separate computing devices described herein. As shown in FIG. 5, the transcoder 412 may receive an input feed 502 (e.g., a master feed, encoded video, etc.). The transcoder 412 may transcode the input feed 502 into multiple streams/feeds 504 with each stream having a different bitrate. A bitrate is a measure of the number of bits per some unit of time (e.g., seconds) that can be transmitted over the network. For example, the stream 504a may have a bitrate of 6 megabytes per second (mbps) and may have an I-frame interval of 1.5 seconds. The stream 504b may have a bitrate of 3 mbps and an I-frame interval of 1 second. The stream 504c may have a bitrate of 1 mbps and an I-frame interval of 1 second. The stream 504d may have a bitrate of 400 kilobytes per second (kbps) and an I-frame interval of 0.5 seconds. The packager 404 may package each bitrate stream 504 into a corresponding packaged stream 506 by dividing the stream 504 into multiple blocks 508 with each block including one or more groups of pictures (GOPs) 510. Each GOP 510 may include multiple frames 512 (e.g., I-frames, P-frames, and B-frames). Each GOP 510 may start with an I-frame, which may be a full picture (e.g., a static image). A P-frame (also known as delta frames) may include changes in the image from the previous frame (e.g., the P-frame might not include a full picture). A B-frame may include changes in the image from the previous frame and changes in the images from the following frame (e.g., the B-frame might not include a full picture). A block size of each block 508 may be a time-based measurement and may be between 0.1 seconds and 5 seconds. The block size may correlate to the number of GOPs 510 in the block 508 and/or to an I-frame interval. For example, the block size may be equivalent to the number of GOPs 510 in the block 508 multiplied by the I-frame interval. For example, the packaged stream 506a may have a bitrate of 6 mbps, a 1.5 second I-frame interval, and may include multiple blocks 508a each having three GOPs 510a. Because the I-frame interval is 1.5 seconds and each block 508a has 3 GOPs 510a, the block size may be 4.5 seconds (e.g., the 1.5 second I-frame interval multiplied by the 3 GOPs 510a). In a similar manner, the packaged stream 506b may have a 3 mbps bitrate and may include 3 GOPs 510b in each block 508b with a 1 second I-frame interval resulting in a 3 second block size.

The CKM 406 may determine how frequently and/or a number of times a downstream client device (e.g., the client device 408) will authenticate a content item during either playback of the content item and/or as the content item is received by the client device 408. The determination may be a based on a security level with more frequent client device authentications of the content item representing higher levels of security than less frequent client device authentications of the content item. The CKM 406 may determine how coarsely to divide and/or otherwise partition the section of each bitrate stream transporting the content item into multiple segments 514 based on how frequently or number of times the client device 408 should verify the content item. As an example, if the CKM 406 determines that the client device 408 should authenticate the bits of the section of the first packaged bitrate stream 506a transporting the content item twice, then the CKM 406 may determine that this section of the stream should be divided into two segments 514a with each segment 514 including multiple blocks 508a.

In some embodiments, the CKM 406 may determine that the client device 408 should authenticate the bits of the packaged stream 506b on a block-by-block basis. The CKM 406 may then determine that the packaged stream 506b should be divided into one or more segments 514b where each segment 514b may have the same size as the size of each block 508b. In some embodiments, the CKM 406 may determine that the client device 408 should authenticate the bits of the packaged stream 506c on a GOP-by-GOP basis. The CKM 406 may then determine that the packaged stream 506c should be divided into one or more segments 514c where each segment 514c may have the same size as the size of each GOP 510c. In some embodiments, the CKM 406 may determine that the client device 408 should authenticate the bits of the packaged stream 506d on a frame-by-frame basis. The CKM 406 may then determine that the packaged stream 506d should be divided into one or more segments 514d where each segment 514d may have the same size as the size of each frame 512d. In some embodiments, one or more segments may have a size different than the size of a block, a GOP, or a frame.

As another example, if the CKM 406 determines that the client device 408 should authenticate the section of the stream transporting the content item thirty times, the CKM 406 may determine that this section of the stream should be divided into thirty segments, chunks or fragments. In some embodiments, each of the segments of the stream may have the same size. In other embodiments, each of the segments of the stream may have different sizes. In yet other embodiments, multiple segments of the stream may have the same size and multiple other segments of the stream may have different sizes.

The CKM 406 may associate unique digital rights management metadata with each of the multiple segments. For example, one segment may be associated with a key-based checksum or a digital signature and another segment may be associated with a different key-based checksum or a different digital signature discussed in further detail below. Accordingly, in some embodiments, different unique DRM metadata data may be associated with each different set of blocks, on a per-block basis, on a per-GOP basis, on a per-frame basis, or any other partitioning basis of a packaged stream. The manifest file for the content identity may include the DRM metadata of each of the segments.

In some embodiments, the CKM 406 may determine the authentication mechanism that the client device 408 will use to authenticate the bits of a segment 514 of a section of the stream transporting the content item. An authentication mechanism may be a key-based checksum such as a hash-based message authentication code (HMAC) using the SHA1 hash function (e.g., HMACSHA1) or other hashing functions. As an example, an authentication mechanism of one of the segments may include key-based checksum over the aggregation of all of the content item's bits in that segment. In such an example, the client device 408 may calculate the key-based checksum over the aggregation of the segment's bits and determine whether the calculated key-based checksum for the segment matches (e.g., equals) a received key-based checksum for the segment. Another authentication mechanism may be a digital signature of the segment. The new manifest file may include the key-based checksum or digital signature of each segment, which will be sent to the client device 408 to permit the client device 408 to authenticate each segment of the section of the stream transporting the content item. The new manifest file may also include markers such as segment identifiers or time codes (e.g., start and end time of a segment on the stream) with which to use a particular key-based checksum or digital signature.

Additionally or alternatively, rather than the authentication mechanism being applied to the bits of the segment, the authentication mechanism may be applied to the markers or time codes of the segment. For example, the client device 408 may calculate a key-based check sum of the current segment's identifier and determine whether the calculated key-based checksum matches a received key-based checksum of that segment's identifier included in the new manifest file. For example, the client device 408 may calculate a key-based checksum of the start and end times of a segment and determine whether the calculated key-based checksum matches a received key-based checksum of that segment's start and end times included in the new manifest file. In some embodiments, a manifest file may be part of the DRM content information shown in FIG. 4.

In step 320, a computing device (e.g., the adaptive rights controller 122, packager 404, CKM 406, etc.) may generate and/or otherwise determine entitlement limitations specific to the content identity of the content item. An entitlement may be any form of data access control of the content item by downstream client devices. For example, the entitlements may be one or more rules or encoded policies that should be met in order for a downstream client device (e.g., client device 408) to allow and/or otherwise permit access to decryption keys for decrypting the requested content item discussed in further detail below. Because the rights and usage limits of the entitlements is specific to each content identity, the CKM 406 permits customization of the rights and usage limits for each unique instance (package, version, recording, etc.) of the content item via the content identity.

The CKM 406 may generate entitlements for a specific content identity with privileges tailored to the content item's class of content (e.g., VOD rental package, local recording, etc.) and conveyed to downstream client devices via DRM licenses. A DRM license may be a message granting access to the content identity and may include encoded expressions specifying entitlement limits of the content identity. The DRM license may be included in the new manifest file, which is included in the DRM content information shown in FIG. 4.

The CKM 406 may determine entitlement limits based on a variety of entity information including the user's account identity. For example, an entitlement limit may be that the user should be signed in to the user's account in order for the client device 408 to play the content item. If the user is not signed in to the user's account, the client device 408 might not play the content item since this entitlement limit would not be satisfied. Further, the CKM 406 may determine entitlement limits based on content identity groups. As an example, previously-generated content identities may be grouped into one or more groups that have specific policies. If a newly generated content identity is placed into a group, the content identity may have the specific policies for that group.

The CKM 406 may also determine entitlement limits based on temporal considerations. For example, in the case of a VOD rental package of a movie, the CKM 406 may set the time period (e.g., 24-hours, 48-hours, week, etc.) during which the client device 408 may playback the content item. The entitlement may include a start time and an end time of the permitted time period. In each instance where the user attempts to play the content item, the client device 408 may determine whether the current time is between the start time and the end time and, if so, permits the client device 408 to play the content item. If not, the client device 408 might not play the content item. For example, in the case of linear multicast on an ongoing stream, the entitlement's permission to access the ongoing stream may be subject to termination at the end of the user's current subscription period. As a result, once the user's subscription to the ongoing stream expires, the client device 408 might not play content items transported on the ongoing stream.

In the case of a content identity for a recording of a content item, the entitlement may include the start time and end time during which the client device may record a linear ongoing stream. For example, the entitlement may permit recording of the ongoing stream associated with channel 2 between 8:00 pm and 10:00 pm. In such instances, the client device may record the content on the ongoing stream between 8:00 pm and 10:00 pm but might not permit recording content transported on the ongoing stream prior to 8:00 pm and after 10:00 pm. Additionally, the CKM 406 might not generate an entitlement limitation on the extent of time the client device 408 may store and play the recorded content item.

The CKM 406 may also determine entitlement limits based on a variety usage restrictions. For example, the CKM 406 may generate entitlement limits for online and offline viewing privileges. In some instances, the entitlement may permit the client device to play the content item when the client device 408 is online (e.g., in communication with the local office 103). In such instances, the entitlement might not permit the client device to play the content item when the client device 408 is offline (e.g., not in communication with the local office 103). In other instances, the entitlement may permit the client device 408 to play the content item regardless of whether the client device is online or offline. The CKM 406 may generate entitlement limits specific to a computing device. For example, an entitlement may permit playback of the content item on the client device 408 but not on another client device. For example, an entitlement may permit playback of the content item by a computing device bound to a specific account (e.g., the user's account) provided the computing device remains registered with the account. For example, a user may have multiple computing devices such as a DVR, a laptop, and a tablet. The user may register each of those devices with the user's account. As a result, an entitlement may permit playback of the content item from the user's DVR, laptop, or tablet but might not permit playback from a friend's laptop.

The CKM 406 may also determine and/or otherwise generate encryption parameters including DRM content keys, which include decryption keys using any encryption standard. In some embodiments, the content keys may decrypt encrypted content sent to downstream client devices. For example, the local office 103 may encrypt the requested content item using one or more content keys prior to streaming the requested content item to the client device 408. As a result, the client device 408 may have to decrypt the content item in order to play the content item. In some embodiments, the CKM 406 may generate entitlement control messages (ECMs) that may be provided to the client device 408 to enable the client device 408 to derive the one or more content keys. In some embodiments, the content keys may be provided in a header of a content item being streamed to downstream client devices and/or in entitlement control messages (ECMs). In some embodiments, the content keys may be generated and transmitted to the downstream client devices in accordance with the public-key cryptography standard number 7 (PKSC7) standard, which is a cryptographic message syntax standard used to sign and/or encrypt messages under a public key infrastructure (PKI).

Figure 6:
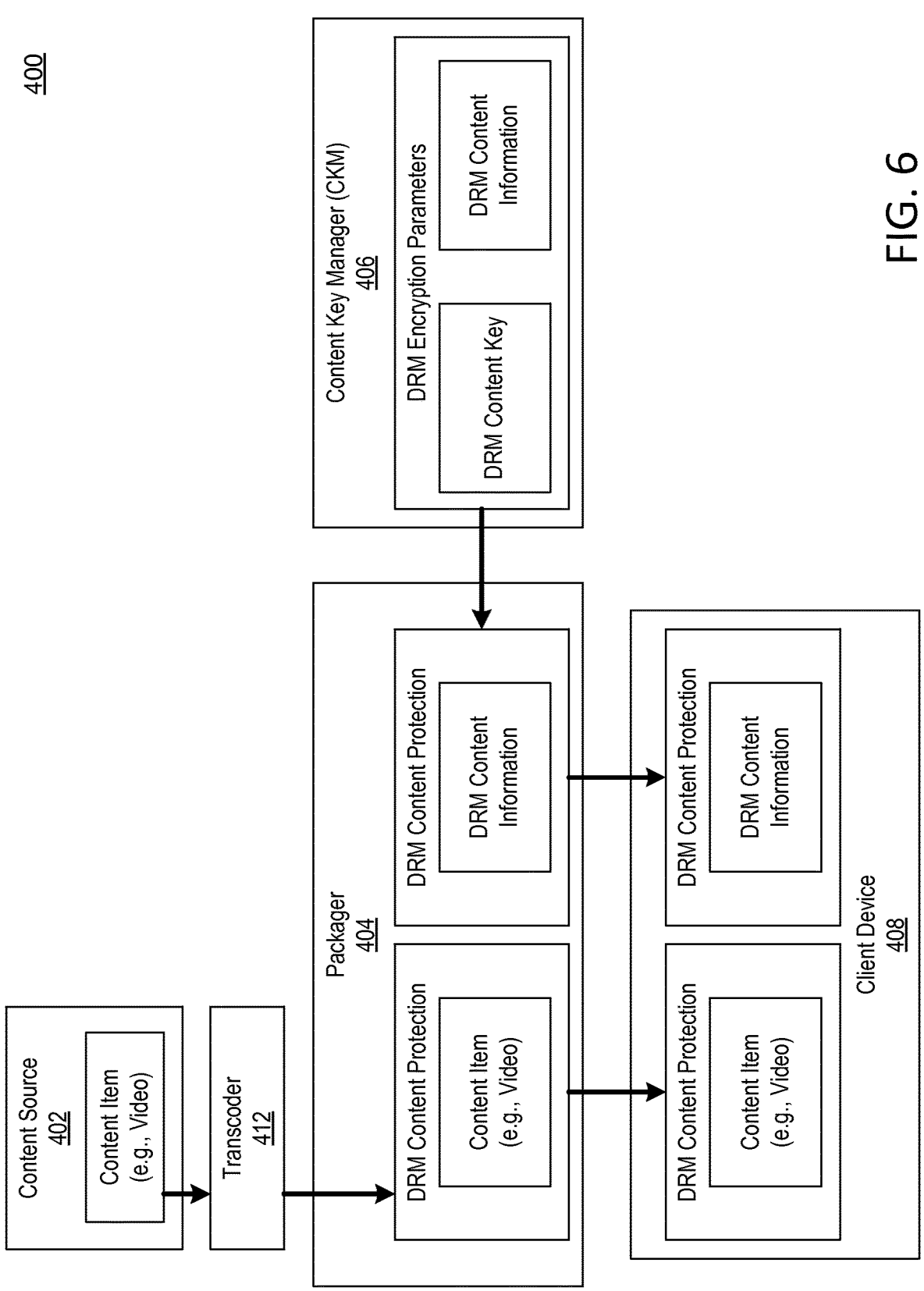
FIG. 6 depicts an illustrative message flow for a DRM video protection response in accordance with one or more illustrative aspects discussed herein.

In step 325, a computing device (e.g., the adaptive rights controller 122, packager 404, etc.) may transmit, to the client device 408, the requested content item with DRM content information in a multi-bitrate stream. FIG. 6 depicts an illustrative message flow for a DRM video protection response in accordance with one or more illustrative aspects discussed herein. As shown in FIG. 6, the CKM 406 may transmit the DRM encryption parameters (e.g., the DRM content keys and the DRM content information) to the packager 404. As shown in FIG. 5, the packager 404 may receive a multi-bitrate stream 504 transporting the content item and may package each of the bitrate streams 504 into a corresponding packaged stream 506 of blocks 508 including GOPs 510 that include frames 512.

The packager 404 may generate a header for the content item that includes the DRM content information, which may include the manifest file (e.g., segment information such as segment identifiers and size, key-based checksums, digital signatures, etc.) and the DRM license (e.g., encoded entitlement policies) for the particular content identity associated with the requested content item. In some embodiment, the packager 404 may insert markers into the packaged stream 506 at the beginning and/or end of each segment. In other embodiments, the packager 404 might not insert markers into the packaged stream 506.

In some embodiments, each header may include alignment information in the DRM content information of each packaged bitrate stream 506 to enable the client device 408 to switch between each of the packaged bitrate streams 506 and still be able to authenticate each of the segments. For example, an alignment point may be a point at which the end of a segment on one bitrate stream temporally aligns with the beginning of a segment on another bitrate stream. As a result, the client device 408 may be able to accurately calculate e.g., the key-based checksum for each segment since the key-based checksum will be based on all of the bits corresponding to the segment. Otherwise, if the client device 408 switches packaged bitrate streams when the segments on the two packaged bitrate streams are not aligned, the client device 408 might not receive all of the bits corresponding to at least one of the segments, which may result in an inaccurate calculation of the key-based checksum for that segment. Additionally, each alignment point may correspond to the end of a GOP on the packaged bitrate stream the client device 408 is switching from and the beginning of a GOP on the packaged bitrate stream the client device 408 is switching to, which enable the client device 408 to switch from one packaged bitrate stream to another packaged bitrate stream without interruption in playback since the I-frame of the GOP will be first frame played once the client device 408 switches to that stream.

Alternatively, in other embodiments, rather than providing DRM metadata for each segment in a header of the multi-bitrate stream, the packager 404 may provide unique DRM metadata in a header of each segment. For example, the packager 404 may generate multiple headers for a bitrate stream with each segment having a corresponding header including DRM metadata for that segment. The DRM metadata of a segment may include, for example, content identifier authentication mechanism, one or more policies, and one or more verifiable artifacts of the content item (e.g., key-based checksum values, digital signatures, etc.).

Figure 7:
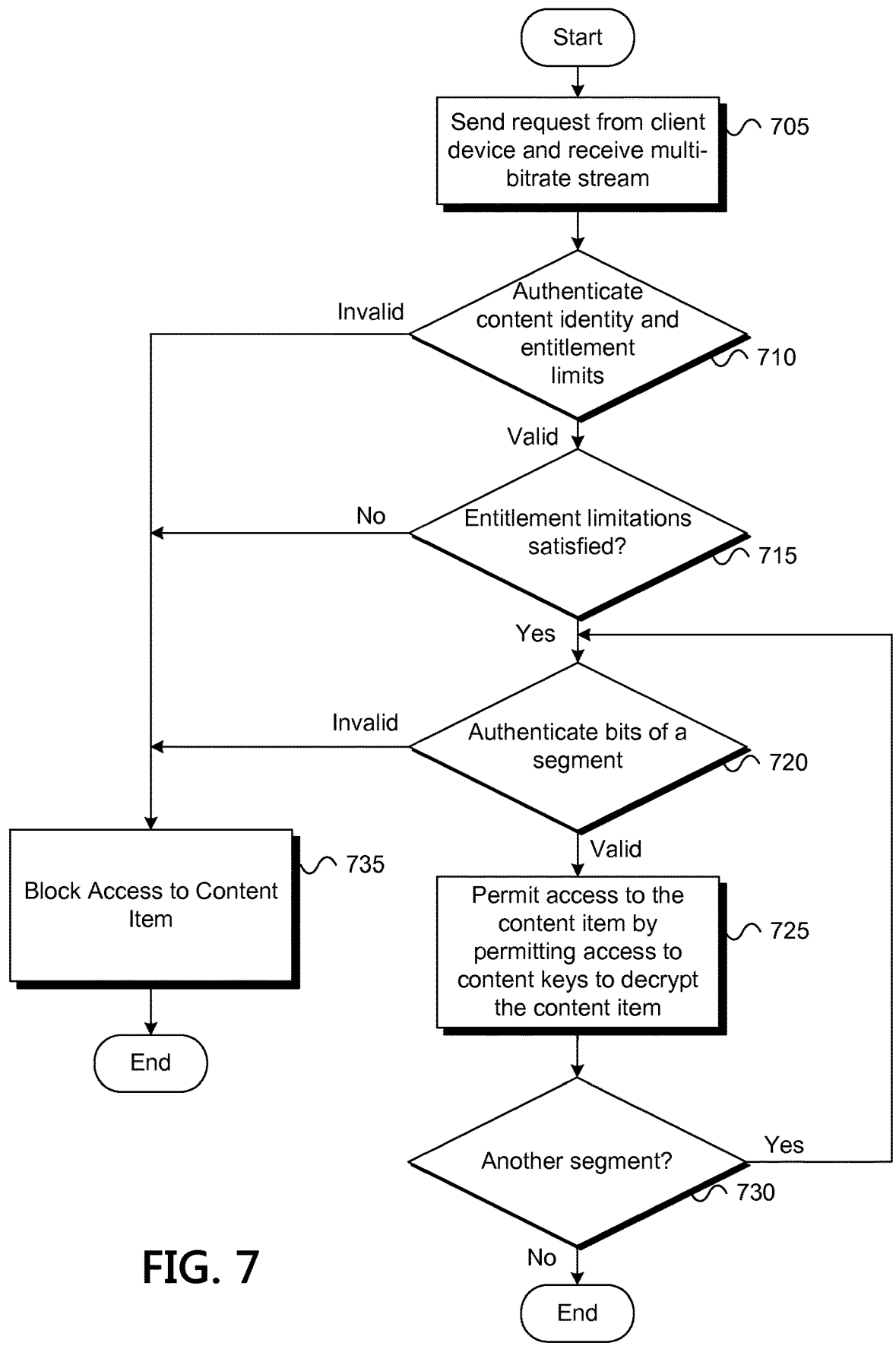
FIG. 7 depicts a flowchart of an illustrative method of authenticating content items using policy-based digital rights in accordance with one or more illustrative aspects discussed herein.

The client device 408 may be a tamper-resistant client device trusted to maintain entitlement policy integrity to reliably authenticate a content identity, content item members, and entitlement limits. The client device 408 may be relied upon to conditionally display the content item based on whether each of the policies associated with the entitlement limits are satisfied. FIG. 7 depicts a flowchart of an illustrative method of authenticating content items using policy-based digital rights in accordance with one or more illustrative aspects discussed herein. In one or more embodiments, the method of FIG. 7 and/or one or more steps thereof may be performed by a computing device (e.g., computing device 200). In other embodiments, the method illustrated in FIG. 7 and/or one or more steps thereof may be embodied in computer-executable instructions that are stored in a computer-readable medium, such as a non-transitory computer-readable memory. In some instances, one or more of the steps of FIG. 7 may be performed in a different order. In some instances, one of more of the steps of FIG. 7 may be omitted and/or otherwise not performed.

As seen in FIG. 7, the method may begin at step 705 in which a computing device (e.g., the client device 408) may transmit a request for a content item. As discussed above, the request may be, for example, a request for a rental package of a movie, a request to recording the ongoing linear stream associated with channel 2 between 8:00 pm and 10:00 pm, etc. In response to sending the request, the client device 408 may receive a multi-bitrate stream of the content item. For example, the client device 408 may receive, from the packager 404, multiple streams of the content item at different bitrates (e.g., packaged bitrate streams 506) from which the client device 408 may decide which stream to fetch. Regardless of which stream is fetched, each bitrate stream may include a header that includes a manifest file containing DRM metadata specific to the content identity of the transmitted content item. In some embodiments, the manifest file may specify the section (e.g., time codes) of the multi-bitrate stream that includes the requested content item associated with content identity. The manifest file may also include instructions instructing the client device to perform one or more of the steps of FIG. 7 to playback the content item.

In one or more embodiments, the client device 408 may perform steps 710-735 in response to a triggering event. In some embodiments, the triggering event may be receiving the header of the multi-bitrate stream. In some embodiments, the triggering event may be when the client device 408 attempts to and/or otherwise receives user input instructing the client device 408 to record the content transported on the multi-bitrate stream. In some embodiments, the triggering event may be attempted playback of content item as the content item is received on the multi-bitrate stream. In some embodiments, the triggering event may be attempted playback of a recorded content item stored at the client device 408.

In step 710, the client device 408 may authenticate the content identity of the requested content item and the corresponding entitlement limits (e.g., encoded policies). For example, the client device 408 may retrieve the DRM content information from the manifest file. The client device 408 may then authenticate the content identity. As an example the content identity of a recording may include the linear origin (e.g., the ongoing stream associated with channel 2), start time (e.g., 8:00 pm), and end time (e.g., 10:00 pm). The client device 408 may determine a digital signature of the linear origin, a digital signature of the start time and a digital signature of the end time. The client device may then compare these signatures respectively with a digital signature of the linear origin, a digital signature of the start time, and a digital signature of the end time provided in the manifest file.

If one or more of the items (e.g., the linear origin, start time, end time, etc.) could not be authenticated, the client device 408 may proceed to step 735 and block access to the content item discussed in further detail below. Otherwise, if each of the items were authenticated, the client device 408 may proceed to step 715.

In step 715, the client device 408 may determine whether the entitlement limitations associated with the content identity have been satisfied. The client device 408 may retrieve one or more encoded policies representing one or more entitlement limits from the DRM license contained in the manifest file. As discussed above, the policies may be tailored to the content item's content class, environmental factors, and usage restrictions.

If the DRM license includes one or more encoded policies for entity-based entitlement limits (e.g., a user's account, a content identity group, etc.), the client device 408 may determine whether the current account signed in at the client device 408 satisfies the restriction. For example, if the client device 408 determines that the user is signed into her account in an application, the client device 408 may determine that this policy has been satisfied. Otherwise, if the client device 408 determines that a friend of the user is signed to into the friend's account in the application, the client device 408 may determine that this condition has not been satisfied.

If the DRM license includes one or more encoded policies for temporal-based entitlement limitations, the client device 408 may determine whether current time satisfies the restriction. For example, if the content identity is associated with a 24-hour rental package, the DRM license may include a policy defining the time during which the content item may be accessed. In one or more arrangements, the policy may include a start time and an end time of the time period. The client device 408 may determine the current time (e.g., the time at which the access to the content item is being requested and/or otherwise attempted). The client device 408 may compare the current time with the start time and the end time to determine whether the current time is between the start time and the end time. The current time, start time, and end time may each be specified in terms year, month, day, hours, minutes, seconds, sub-seconds, etc. If the client device 408 determines that the current time is within the start time and end time defining the 24-hour rental period, the client device 408 may determine that this temporal-based policy is satisfied. Otherwise, if the client device 408 determines that the current time is not within (e.g., outside of) of the start time and the end time defining the 24-hour rental period, the client device 408 may determine that this temporal-based policy is not satisfied.

As another example, if the content identity is associated with an ongoing stream, the DRM license may include a policy for subscription verification. The client device 408 may determine whether the user is currently subscribed to the ongoing stream (e.g., by sending a verification request to the local office 103 and receiving an indication of the user's subscription status as to the ongoing stream or by storing subscription status information at the client device 408). If the client device 408 determines that the user is no longer subscribed to the ongoing stream, the client device 408 may determine that this policy is not satisfied. Otherwise, if the client device 408 determines that the user is currently subscribed to the ongoing stream, the client device 408 may determine that the policy is satisfied.

As yet another example, in the case of a content identity for a recording of a content item, the DRM license may include a policy of the time period (e.g., the start time and end time) during which the client device 408 may record content on the ongoing stream. For example, the policy may permit recording of the ongoing stream associated with channel 2 between 8:00 pm and 10:00 pm. The client device 408 may determine the current time (e.g., the time at which the user may attempt to initiate recording of content on the ongoing stream). If the current time is between 8:00 pm and 10:00 pm, the client device 408 may determine that this policy is satisfied. Otherwise, if the client device 408 determines that the current time is not between 8:00 pm and 10:00 pm, the client device 408 may determine that the policy is not satisfied.

The DRM license may include one or more encoded policies for enforcing the entitlement limits on usage. For example, the DRM license may include a policy that the user may only view the content item associated with the content identity when online. Thus, if the client device 408 determines that the client device 408 is in an offline state (e.g., not communicatively connected to the local office 103), the client device 408 may determine that the policy has not been satisfied. Otherwise, if the client device 408 determines that the client device 408 is in an online state (e.g., communicatively connected to the local office 103), then the client device 408 may determine that this policy is satisfied.

As another example, the DRM license may include a policy identifying which computing devices may record and/or playback the content item. In some instances, the policy may identify such computing devices by their MAC address or any other identifier. The client device 408 may determine whether its identifier (e.g., its MAC address) matches one of the identifier (e.g., MAC addresses) listed in the policy. If so, the client device 408 may determine that the policy is satisfied. Otherwise, if the client device 408 determines its identifier does not match one of the identifiers listed in the policy, the client device 408 may determine that the policy is not satisfied.

If one or more of the policies listed in the DRM license for the content identity are not satisfied, the client device 408 may proceed to block access to the content item in step 735, which is discussed in further detail below. Otherwise, if the client device 408 determines that each (e.g., all) of the policies included in the DRM license for the content identity is satisfied, the client device 408 may proceed to step 720.

In step 720, the client device 408 may authenticate the bits of one of the multiple segments to determine if the segment is a member of the content identity. For example, the client device 408 may retrieve from the header information identifying the section of the multi-bitrate stream that includes the request content item. In some instances, the identifying information may be a start time and an end time of the content item. Additionally, the client device 408 may determine from the DRM content information any information identifying the markers or segments of the section of the multi-bitrate stream transporting the content item. The information identifying the marker or segments may also include ordering information so as to distinguish the first marker or segment from the temporal second marker or segment received in the section of the multi-bitrate stream. Additionally, the client device 408 may retrieve each segment's or marker's authentication mechanism from the DRM content information. For example, the client device may retrieve a key-based checksum values or a digital signature for each segment. In some embodiments, the temporal ordering information of the segments or markers and the authentication mechanism may be in the form of a schedule. In some embodiments, the DRM content information may include one or more hashing functions by which the client device 408 may calculate key-based checksum values for the segments.

In one or more arrangements, once the client device 408 loads the first segment for processing (e.g., playback, recording, etc.), the client device 408 may calculate a key-based checksum value over the aggregation of all of the first segment's bits. The client device 408 may then compare the calculated key-based checksum value with the first segment's key-based checksum value provided in the DRM content information. If the client device 408 determines that the first segment's calculated key-based checksum value matches the provided key-based checksum value for the first segment, the client device 408 may determine that the first segment of the content item is authentic and may proceed to step 725. Otherwise, if the key-based checksum values do not match, the client device 408 may determine that the first segment is not authentic and may proceed to step 735 discussed in further detail below.

Alternatively, rather than using key-based checksum values, the client device 408 may calculate a digital signature of the first segment and compare the calculated digital signature with a digital signature for the first segment provided in the DRM content information. If the digital signatures match, the client device 408 may determine that the first segment is authentic and may proceed to step 725. Otherwise, if the digital signatures do not match, the client device 408 may proceed to step 735.

In step 725, the client device 408 may permit access to the content item by permitting access to content keys to decrypt the content item. For example, the local office 103 encrypts the content item prior to transferring the content item on the multi-bitrate stream. In some embodiments, the DRM content information may include one or more content keys to decrypt one or more segments of the content item. In other embodiments, one or more ECMs may be sent to the client device 408 from which the client device 408 may derive one or more content keys. Once the client device 408 has determined that the content identity is authentic, the entitlement limits are satisfied, and the loaded segment is authentic, the client device 408 may access the one or more content keys and decrypt the segment of the content item for playback.

For example, the client device 408 may access one or more content keys to decrypt the segment of the content item for playback. In the case of a VOD 24-hour rental package of a movie, the client device 408 may decrypt the segment of the movie and begin playback prior to receiving the entire movie. In the case of recording a content item, the client device 408 might not decrypt the segment of the content item until the client device 408 plays the segment of the content item. As a result, the client device 408 might not decrypt the segment of the content item to re-encrypt the content item for later playback.

In step 730, the client device 408 may determine whether there is another segment of the content item. For example, the client device 408 may determine whether there is another segment by consulting the DRM content information (e.g., the segment or marker identifiers, the schedule, etc.). If there is another segment of the content item, the client device 408 may repeat steps 720 and 725 for e.g., a second segment. For example, in step 720, the client device may authenticate the second segment by comparing a calculated key-based checksum value based on the aggregation of the second segment's bits with a provided key-based checksum value for the second segment. For example, in step 725, if the client device 408 determines that the second segment is authentic, the client device 408 may access one or more content keys to decrypt the second segment of the content item for playback. For example, in step 730, the client device 408 may then determine if there is a third segment of the content item. The client device 408 may repeat steps 720-730 either until all of the segments of the content item have been authenticated, decrypted and played or until one of the segments is not authentic, which in such cases the client device 408 may proceed to step 735.

As described above, the client device 408 commences video processing checking of its state at the onset of usage and on a periodic ongoing basis as video is processed. As video is loaded, each video element or segment is verified as a member of a content identity. Additionally, because the segment may correspond to one or more blocks of the packaged bitrate stream, to one or more GOPs of a block, and/or to one or more frames of GOP, the client device 408 may authenticate a bitrate stream on a block-by-block basis, a GOP-by-GOP basis, a frame-by-frame basis, a set of blocks-by-a set of blocks basis, a set of GOPs-by-a set of GOPs basis, a set of frames-by-a set of frames basis, and/or any combination thereof. In some embodiments, the segment might not correspond to a block, GOP, or frame.

As described above and illustrated in FIG. 7, the client device 408 is trusted to permit access to the content keys based on the authenticity of each item associated with a content identity and each segment of the content item as well as based on each policy being satisfied. If the client device 408 attempts to process any bits beyond what would characterize the DRM content information, then that would be a policy violation and the client device 408 would then shut down access to the keys in step 735.

In step 735, the client device 408 may block access to content item. For example, the client device 408 may block access to the one or more content keys so that the client device 408 might not decrypt one or more segments of the content item to block content playback.

As discussed above, the system discussed herein permits differentiated access to the same video, or portions of the same video, where any DRM-type client may read a manifest file including content verification data, which may be video authentication information that is specific to the video.

As illustrated above, various aspects of the disclosure relate to using dynamic generation of metadata files to provide a policy-based copyright enforcement mechanism. In other embodiments, however, the concepts discussed herein can be implemented in any other type of computing device (e.g., a desktop computer, a server, a console, a set-top box, etc.). One or more instructions or steps described herein may be stored on a computer-readable medium. The instructions or steps when executed by a processor may cause a computing device to perform one or more functions.

Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
  receiving, by a computing device and from a user device, a request indicating a use of a content item;
  generating, based on the request, a manifest file for the indicated use of the content item, wherein the manifest file comprises:
    a plurality of digital rights management (DRM) authentication values for a plurality of segments of the content item,
    a plurality of decryption keys for the plurality of segments of the content item,
    a DRM license for the indicated use of the content item, wherein the DRM license identifies the user device,
    one or more policies for controlling the indicated use of the content item by the user device in accordance with the DRM license, and
    one or more executable instructions that, when executed by the user device, cause the user device to:
      enforce the one or more policies for controlling the indicated use of the content item, and
      after enforcing the one or more policies, authenticate the plurality of segments of the content item; and
  sending the manifest file to the user device.

2. The method of claim 1, further comprising:
  generating a digital signature for a linear origin of the content item, wherein the content item is on a stream; and
  storing the digital signature in the manifest file.

3. The method of claim 1, wherein each segment, of the plurality of segments, corresponds to a different group of pictures of the content item.

4. The method of claim 1, wherein each segment, of the plurality of segments, corresponds to a different frame of the content item.

5. The method of claim 1, wherein the plurality of DRM authentication values comprises, for each segment of the plurality of segments, one of a key-based checksum value or a digital signature.

6. The method of claim 1, further comprising:
  generating a multi-bitrate stream comprising a first bitrate stream and a second bitrate stream, wherein each segment, of the plurality of segments, corresponds to a different group of pictures of the content item on the first bitrate stream, and wherein each segment, of the plurality of segments, corresponds to a different frame of one or more groups of pictures of the content item on the second bitrate stream.

7. The method of claim 6, further comprising:
  determining transition points between the first bitrate stream and the second bitrate stream based on each segment, of the plurality of segments, on the first bitrate stream and each segment, of the plurality of segments, on the second bitrate stream, wherein the manifest file further comprises indications of the determined transition points.

8. The method of claim 1, wherein the one or more policies comprise one or more of:
  a rental period policy corresponding to a time period for a rental of the content item associated with the indicated use of the content item,
  a subscription verification policy associated with the indicated use of the content item, or
  a license verification policy for the indicated use of the content item.

9. The method of claim 1, wherein the one or more policies indicates that a recording of the content item is permitted.

10. The method of claim 1, wherein the plurality of decryption keys comprises a different decryption key for each segment of the plurality of segments.

11. The method of claim 1, wherein the request indicating the use of the content item comprises one or more of: a request for video on demand access to the content item, a request for a rental of the content item, a request for a purchase of the content item, a request for access to a stream containing the content item, a request to record the content item, a request to access a recording of the content item, or a request to access a preview of the content item.

12. The method of claim 1, wherein the manifest file indicates:
  a channel associated with a linear stream of the content item,
  a broadcast start time of the content item, and
  a broadcast end time of the content item.

13. The method of claim 1, wherein the request indicating the use comprises a request to playback a digital video recorder (DVR) recording of the content item, and wherein the manifest file further comprises:
  an indication that the content item comprises the DVR recording.

14. The method of claim 1, wherein the request indicating the use comprises a request for a video-on-demand (VOD) rental of the content item, and wherein the manifest file further comprises:
   an indication that the content item comprises VOD content,
   a rental time period associated with the request, and
   an indication of a user account, associated with the user device, that is permitted to use the DRM license.

15. The method of claim 1, wherein the DRM license grants access to the content item only for the indicated use.

16. A method comprising:
   receiving, by a computing device and from a user device, a request indicating a use of a content item;
   determining, based on the indicated use of the content item, a plurality of digital rights management (DRM) metadata and a plurality of decryption keys that are associated with a plurality of segments of the content item, wherein the plurality of DRM metadata comprises:
      a plurality of authentication values for the plurality of segments,
      a DRM license for the indicated use of the content item, wherein the DRM license identifies the user device, and
      one or more policies for controlling the indicated use of the content item by the user device in accordance with the DRM license;
   generating one or more executable instructions that, when executed by the user device, cause the user device to:
      enforce the one or more policies for controlling the indicated use of the content item, and
      after enforcing the one or more policies, authenticate the plurality of segments of the content item; and
   sending, to the user device and in a header of a stream transporting the plurality of segments of the content item, the plurality of DRM metadata, the plurality of decryption keys, and the one or more executable instructions.

17. The method of claim 16, wherein each segment, of the plurality of segments, corresponds to a different frame of the content item, the method further comprising:
   instructing the user device to authenticate the content item on a frame-by-frame basis.

18. The method of claim 16, wherein each segment, of the plurality of segments, corresponds to a different group of pictures (GOP) of the content item, the method further comprising:
   instructing the user device to authenticate the content item on a GOP-by-GOP basis.

19. The method of claim 16, further comprising:
   generating, based on the request, a content identity for packaging the content item as a recording with the plurality of DRM metadata.

20. The method of claim 16, wherein the determining the plurality of DRM metadata comprises:
   associating a first key-based checksum value with a first segment of the plurality of segments; and
   associating a second key-based checksum value with a second segment of the plurality of segments.

21. The method of claim 16, wherein the determining the plurality of DRM metadata comprises:
   associating a first digital signature with a first segment of the plurality of segments; and
   associating a second digital signature with a second segment of the plurality of segments.

22. A method comprising:
   sending, from a user device and to a computing device, a request indicating a use of a content item;
   receiving, after the sending, the content item and a manifest file for the indicated use of the content item, wherein the manifest file comprises:
      a plurality of digital rights management (DRM) authentication values for a plurality of segments of the content item,
      a plurality of decryption keys for the plurality of segments of the content item,
      a DRM license for the indicated use of the content item, wherein the DRM license identifies the user device, and
      one or more policies for controlling the indicated use of the content item by the user device in accordance with the DRM license;
   enforcing the one or more policies for controlling the indicated use of the content item;
   after enforcing the one or more policies, authenticating each segment, of the plurality of segments, based on a DRM authentication value for the segment; and
   decrypting each segment, of the plurality of segments, using a decryption key for the segment.

23. The method of claim 22, wherein the manifest file causes:
   the enforcing the one or more policies for controlling the indicated use,
   the authenticating each segment of the plurality of segments, and
   the decrypting each segment of the plurality of segments.

24. The method of claim 22, wherein the receiving further comprises:
   receiving a multi-bitrate stream comprising a first bitrate stream and a second bitrate stream, wherein each segment, of the plurality of segments, corresponds to a different group of pictures of the content item on the first bitrate stream, and wherein each segment, of the plurality of segments, corresponds to a different frame of one or more groups of pictures of the content item on the second bitrate stream; and
   wherein the manifest file is received in a header of the first bitrate stream and a header of the second bitrate stream.

25. The method of claim 16, wherein the plurality of decryption keys comprises a different decryption key for each segment of the plurality of segments.

* * * * *